United States Patent [19]

Halter et al.

[11] Patent Number: 4,955,802
[45] Date of Patent: Sep. 11, 1990

[54] BLOW-EXTRUDING A MULTILAYER SYNTHETIC-RESIN TUBE

[75] Inventors: Hartmut Halter, Troisdorf; Willi Schnell, Köln, both of Fed. Rep. of Germany

[73] Assignee: Reifenhauser GmbH & Co. Maschinenfabrik, Troisdorf, Fed. Rep. of Germany

[21] Appl. No.: 363,188

[22] Filed: Jun. 8, 1989

[30] Foreign Application Priority Data

Jun. 16, 1988 [DE] Fed. Rep. of Germany ....... 3820530

[51] Int. Cl.⁵ ............................................. B29C 55/28
[52] U.S. Cl. ................................ 425/72.1; 425/326.1; 425/387.1
[58] Field of Search ................. 425/72.1, 326.1, 387.1, 425/532; 428/36.92; 264/564–569

[56] References Cited

U.S. PATENT DOCUMENTS

| | | |
|---|---|---|
| 2,966,700 | 1/1961 | Dyer et al. ................. 425/326.1 X |
| 3,902,832 | 9/1975 | Gregory et al. ............. 425/326.1 X |
| 4,105,380 | 8/1978 | Zimmermann .............. 425/326.1 X |
| 4,601,649 | 7/1986 | Upmeier ..................... 425/326.1 X |
| 4,624,823 | 11/1986 | Audureau et al. ................. 264/569 |
| 4,643,657 | 2/1987 | Achelpohl et al. .......... 425/387.1 X |
| 4,678,417 | 7/1987 | Upmeier ............................ 425/72.1 |

FOREIGN PATENT DOCUMENTS

| | | | |
|---|---|---|---|
| 21420 | 1/1981 | European Pat. Off. ........... 425/72.1 |
| 2547455 | 5/1976 | Fed. Rep. of Germany ..... 425/72.1 |
| 56-4433 | 1/1981 | Japan ................................ 425/72.1 |

Primary Examiner—Richard L. Chiesa
Attorney, Agent, or Firm—Herbert Dubno; Andrew Wilford

[57] ABSTRACT

An apparatus for blow extruding a synthetic-resin tube has a nozzle having an annular mouth generally centered on a longitudinal axis for longitudinally outwardly extruding a tubular synthetic-resin strand, an inner stabilizing tube extending longitudinally outward from the nozzle within the mouth thereof and having an outer end spaced a predetermined longitudinal distance from the mouth, and an outer stabilizing tube surrounding the inner tube and defining a longitudinal passage therewith, extending longitudinally outward from the nozzle within the mouth thereof, and having an outer end lying between the outer end of the inner tube and the mouth. The passage opens outward between the outer ends. Cool air is fed to the passage at the mouth and to a space defined between the strand where it emerges from the mouth and the outer tube for flow of this cooling air longitudinally outward between the strand and the outer tube and from the outer end of the outer tube. Thus the strand is expanded transversely generally at the outer ends of the tubes. The cooling air is withdrawn from within the strand by drawing this cooling air into the outer end of the inner tube and longitudinally backward through the inner tube.

9 Claims, 3 Drawing Sheets

BLOW-EXTRUDING A MULTILAYER SYNTHETIC-RESIN TUBE

FIELD OF THE INVENTION

The present invention relates to a system for blow extruding a synthetic-resin tube. More particularly this invention concerns such a system wherein the tube has several layers.

BACKGROUND OF THE INVENTION

A tubular synthetic-resin foil of the type used to make bags is formed by extruding a tubular synthetic-resin strand from an annular mouth of a nozzle. A stabilizer extends centrally from this nozzle and has an open outer end. Cooling air is directed radially inward at the strand as it exits from the nozzle and is also injected into the annular space between the strand and the stabilizer. The cooling air trapped in the strand serves both to expand and cool it, and is aspirated at some longitudinal spacing from the nozzle into the outer end of the stabilizer.

This arrangement is typically oriented vertically with the strand moving up and away from the nozzle. After being expanded by air pressure inside it, the tube is flattened and then is usually cross-welded and perforated or cut into bags.

The stabilizer is typically of circular section and has a closed outer end and perforations at this outer end through which the cooling air is aspirated. Such an arrangement is satisfactory so long as the neck part of the strand, that is the strand before it is radially expanded to the desired size, is relatively short. When, however, high-pressure polyethylenes are being extruded this neck is fairly long, so that it is fairly common for the resin to come into contact with the intake end of the stabilizer tube and become caught, forcing one to shut down the machine and clear the jam.

It has been suggested to avoid this problem by providing along the stream of cooling air flowing along the outside of the strand and spaced from this strand a sleeve which is provided over its length with spaced circularly annular disks which extend into the flow of the outer stream of cooling air. Such a system is only a poor partial solution to the problem in that jams still occur.

OBJECTS OF THE INVENTION

It is therefore an object of the present invention to provide an improved apparatus for blow extruding a tubular synthetic-resin strand.

Another object is the provision of such an improved apparatus for blow extruding a tubular synthetic-resin strand which overcomes the above-given disadvantages, that is which surely and completely eliminates the possibility of the tube being aspirated into the outer end of the stabilizer tube.

SUMMARY OF THE INVENTION

An apparatus for blow extruding a synthetic-resin tube according to this invention has a nozzle having an annular mouth generally centered on a longitudinal axis for longitudinally outwardly extruding a tubular synthetic-resin strand, an inner stabilizing tube extending longitudinally outward from the nozzle within the mouth thereof and having an outer end spaced a predetermined longitudinal distance from the mouth, and an outer stabilizing tube surrounding the inner tube and defining a longitudinal passage therewith, extending longitudinally outward from the nozzle within the mouth thereof, and having an outer end lying between the outer end of the inner tube and the mouth. The passage opens outward between the outer ends. Cool air is fed to the passage at the mouth and to a space defined between the strand where it emerges from the mouth and the outer tube for flow of this cooling air longitudinally outward between the strand and the outer tube and from the outer end of the outer tube. Thus the strand is expanded transversely generally at the outer ends of the tubes. The cooling air is withdrawn from within the strand by drawing this cooling air into the outer end of the inner tube and longitudinally backward through the inner tube.

The cooling air that exits the passage at the outer end of the outer tube therefore ensures that the strand is pushed radially away from the stabilizer at this location, keeping it perfectly on center and making it virtually impossible for the foil to get caught in the outer intake end of the inner tube. The air exiting the passage creates turbulence with the air rising in the annular space between the strand and the outer tube to further form a cushion that holds the strand out away from the stabilizer.

According to this invention the annular longitudinal passage is of generally uniform and constant section or of longitudinally outwardly decreasing flow section The latter system ensures that a veritable jet of air will be played outward on the rising strand.

The outer tube according to this invention telescopes so that the longitudinal position of its inner end can be adjusted. The inner tube carries an external flow collar longitudinally immediately outward of the outer end of the outer tube so that this flow collar forms with the outer end of the outer tube a radially outwardly open annular mouth from which cooling air exits. In addition the outer tube carries at its outer end a radially outwardly projecting flow collar so that cooling air between the strand and the outer tube is deflected outward by this collar also.

The length of the outer tube can be adjusted by appropriate means from outside the strand for varying the longitudinal length of the outer tube and the amount of cooling air fed to the apparatus can be varied as can the ratio of air aspirated through the inner tube and air fed to the interior of the strand.

BRIEF DESCRIPTION OF THE DRAWINGS

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

DESCRIPTION OF THE PREFERRED EMBODIMENTS

Figure 1:
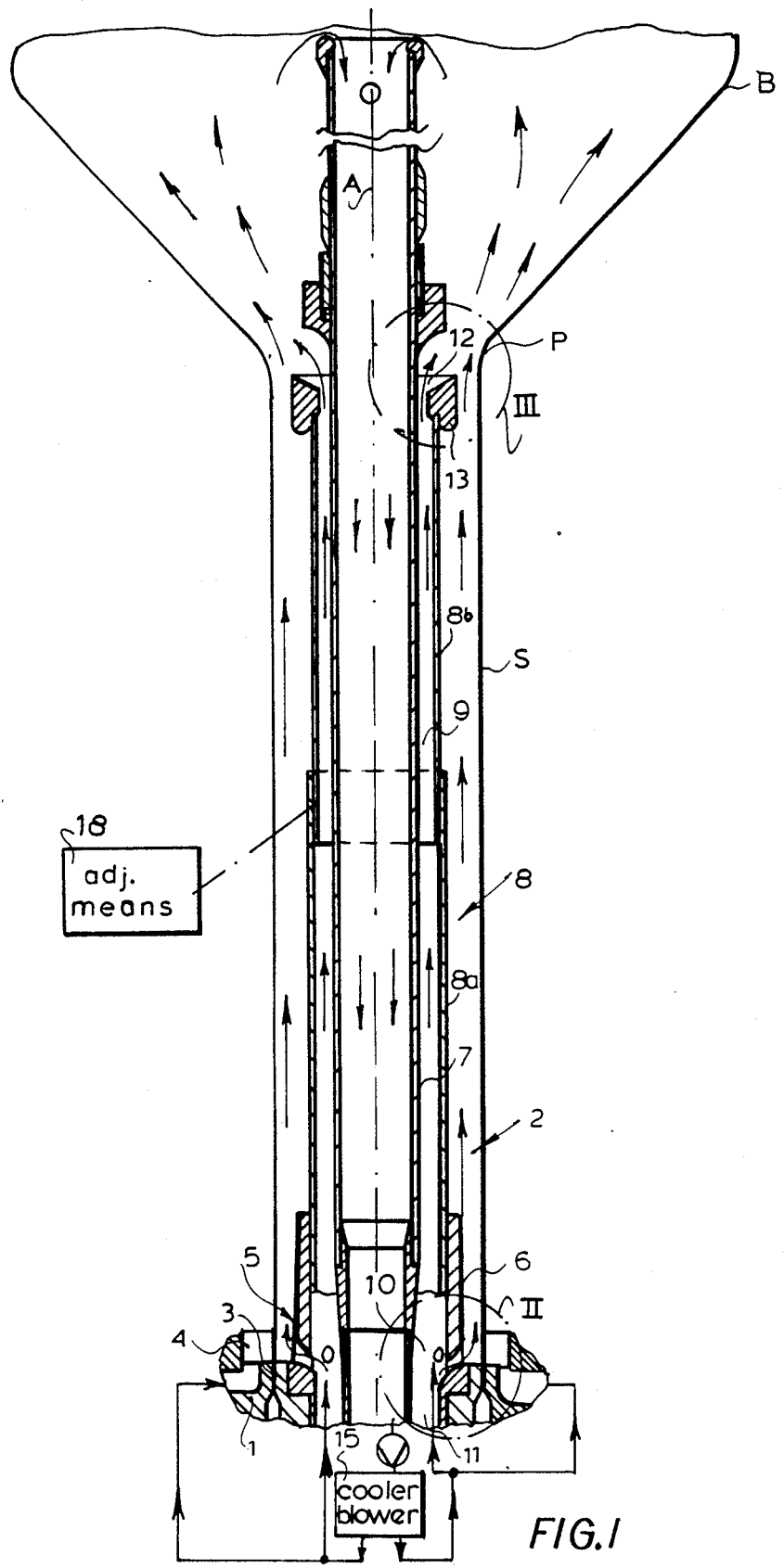
FIG. 1 is an axial section through an apparatus according to this invention.
Figure 2:
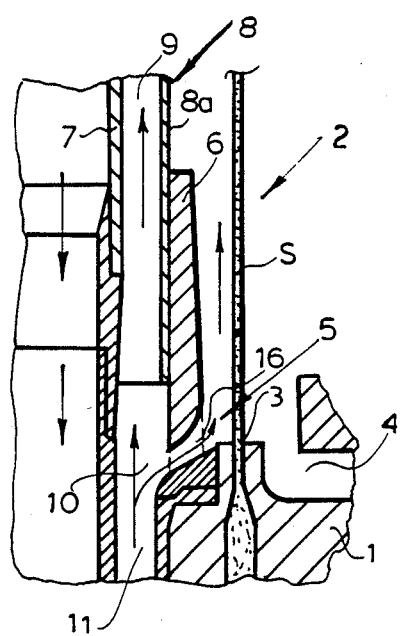
FIGS. 2 and 3 are large-scale views of the details indicated at II and III in FIG. 1, respectively.
Figure 3:
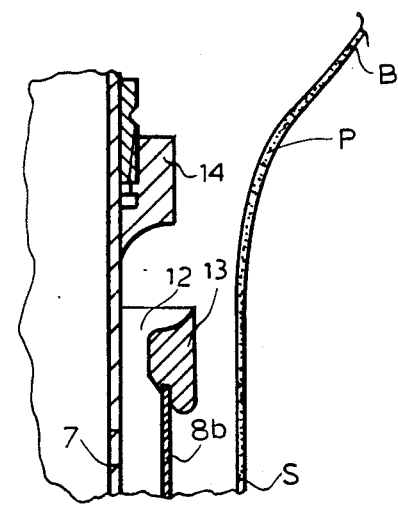

As seen in FIGS. 1 through 3 a blow extruding nozzle 1 according to this invention has an annular mouth 3 centered on a vertical longitudinal axis A and is provided with a stabilizer 2. This nozzle 1 extrudes a small diameter synthetic-resin tube or strand S that is inflated to a large-diameter strand B at a location P spaced some longitudinal distance above the nozzle 1. Cooling air is blown externally on the base of the strand S from an annular nozzle mouth 4 surrounding and spaced radially outward from the mouth 3 and means 5 is provided for injecting cooling air into the interior of the strand S at its base within the nozzle mouth 3.

According to this invention the stabilizer 2 comprises an inner tube 7 and an outer tube 8, the latter being formed of two telescoping parts 8a and 8b. The inner tube 7 has a lower inner end fixed to the nozzle 1 and is connected via a valve to the input of a cooler/blower 15. It is of relatively small diameter and has an outer end that extends well past the expansion location P of the strand S. It carries at this location P a collar 14 whose function will be described below.

The outer tube 8 has a lower inner end secured via a fitting 6 to the nozzle 1, this fitting 6 being formed with an array of angularly equispaced radially throughgoing holes 16. This tube 8 forms with the inner tube 7 an annular longitudinally extending passage 9 that opens at its lower inner end directly into a feed passage 11 to which cooling air is fed by the cooler/blower 15. The cooling air from this blower 15 also is fed via the holes 16 to the space between the strand S and the outer tube 8. The outer end of the tube 8 lies just below the expansion location P and is fitted with a collar 13 so that the passage 9 opens radially at 12 at this location.

Thus with the system of this invention as the strand S moves upward it is cooled externally by air exiting from the nozzle mouth 4 and internally by air entering the space between itself and the stabilizer 2 through the openings 16. In addition cooling air is blown out of the annular mouth 12 at the upper end of the passage 9 just at the expansion location P so that, even if for some reason the tube S has come into contact with the stabilizer the air exiting this mouth 12 will push it away from the stabilizer 2 and absolutely prevent it from being sucked into the outer end of the inner tube 7.

Figure 4:
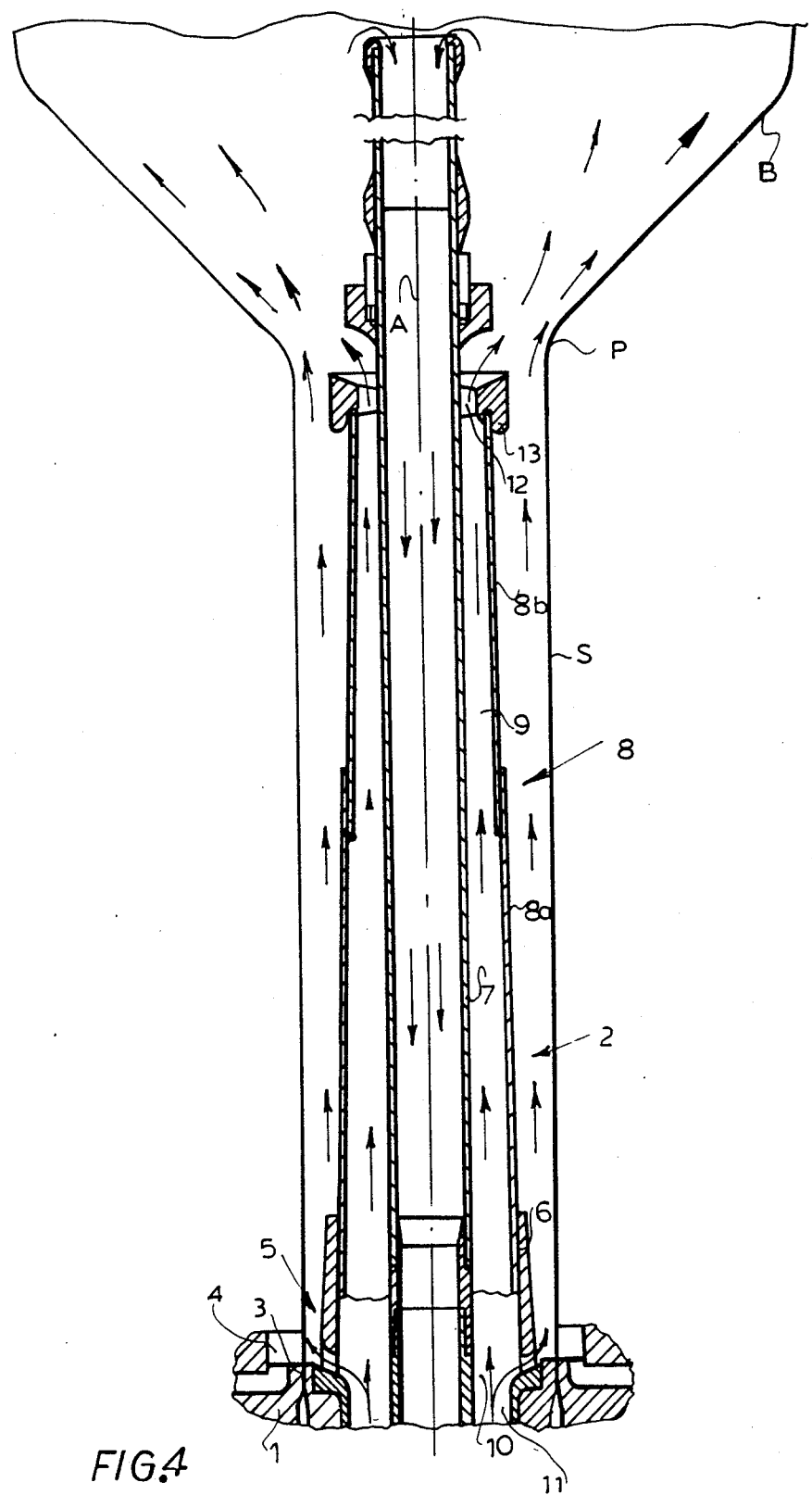
FIG. 4 is a view like FIG. 1 of a variant on the apparatus of this invention.

The length of the outer tube 8 can be adjusted from outside the apparatus by means illustrated schematically at 18 by telescoping the parts 8a and 8b relative to each other to adjust for different resins, as some resins will have a shorter neck region S than others. In addition the tube 8 can either be basically cylindrical as shown in FIGS. 1 through 3 or slightly upwardly tapered as shown in FIG. 4. In the latter case a seal can be provided between the two parts 8a and 8b to prevent leakage at the joint, although a small amount of such leakage is not normally harmful.

We claim:

1. An apparatus for blow extruding a synthetic-resin tube, the apparatus comprising:
    means including a nozzle having an annular nozzle mouth generally centered on a longitudinal axis for longitudinally outwardly extruding a tubular synthetic-resin strand;
    an inner stabilizing tube extending longitudinally outward from the nozzle within the mouth thereof and having an outer end spaced a predetermined longitudinal distance from the nozzle mouth;
    an outer stabilizing tube surrounding the inner tube and defining a longitudinal passage therewith, extending longitudinally outward from the nozzle within the mouth thereof, and having an outer end lying between the outer end of the inner tube and the nozzle mouth and defining with the inner tube an annular inner mouth, the passage opening outward at the inner mouth between the outer ends, the tubes being radially closed between the nozzle mouth and their outer ends;
    means for feeding cooling air to a space defined between the strand where it emerges from the nozzle mouth and the outer tube for flow of this cooling air longitudinally outward between the strand and the outer tube;
    means for feeding cooling air to the passage at the nozzle mouth for flow from the inner mouth at the outer end of the outer tube so as to mix and form turbulence with the air moving longitudinally outward between the strand and the outer tube and thereby expand the strand transversely at the annular inner mouth; and
    means connected to the inner tube for withdrawing the cooling air from within the strand by drawing the cooling air into the outer end of the inner tube and longitudinally backward through the inner tube.

2. The blow extruding apparatus defined in claim 1 wherein the annular longitudinal passage is of generally uniform and constant section.

3. The blow extruding apparatus defined in claim 1 wherein the annular longitudinal passage is of longitudinally outwardly decreasing flow section.

4. The blow extruding apparatus defined in claim 1 wherein the outer tube telescopes, whereby the longitudinal position of its inner end can be adjusted.

5. The blow extruding apparatus defined in claim 4 wherein the inner tube carries an external flow collar longitudinally immediately outward of the outer end of the outer tube, the flow collar deflecting cool air exiting from the inner mouth radially outward.

6. The blow extruding apparatus defined in claim 1 wherein the outer tube carries at its outer end a radially outwardly projecting flow collar, whereby cooling air between the strand and the outer tube is deflected outward by the collar.

7. The blow extruding apparatus defined in claim 1, further comprising means operable from outside the strand for varying the longitudinal length of the outer tube.

8. The blow extruding apparatus defined in claim 1, further comprising means for varying the amount of cooling air fed to the apparatus.

9. The blow extruding apparatus defined in claim 8 wherein the last-mentioned means includes means for varying the ration of air aspirated through the inner tube and air fed to the interior of the strand.

* * * * *